United States Patent [19]

Huver et al.

[11] Patent Number: 5,354,821

[45] Date of Patent: * Oct. 11, 1994

[54] NEW RADICALLY POLYMERIZABLE MULTICOMPONENT MIXTURES AND THEIR USE (III)

[75] Inventors: Thomas Huver; Herbert Fischer, both of Duesseldorf; Winfried Emmerling, Erkrath, all of Fed. Rep. of Germany

[73] Assignee: Henkel Kommanditgesellschaft auf Aktien, Fed. Rep. of Germany

[*] Notice: The portion of the term of this patent subsequent to Dec. 7, 2010 has been disclaimed.

[21] Appl. No.: 90,990

[22] Filed: Jul. 12, 1993

Related U.S. Application Data

[63] Continuation of Ser. No. 655,457, Feb. 28, 1991, abandoned.

[30] Foreign Application Priority Data

Aug. 31, 1988 [DE] Fed. Rep. of Germany ....... 3829461

[51] Int. Cl.$^5$ .............................. C08F 4/26; C09J 5/04
[52] U.S. Cl. .................................... 526/147; 526/90; 526/93; 526/118; 526/213; 526/216; 526/217; 526/319; 526/323.2; 526/341; 526/346; 526/347; 156/327
[58] Field of Search ........................ 526/147, 216, 217

[56] References Cited

U.S. PATENT DOCUMENTS 4,126,504 11/1978 Wolinski .............................. 525/112

FOREIGN PATENT DOCUMENTS 871424 6/1961 United Kingdom .

OTHER PUBLICATIONS

L. Horner et al., Makromolekulare Chemie, 93 (1966) 69–108.

*Primary Examiner*—Fred Zitomer
*Attorney, Agent, or Firm*—Ernest G. Szoke; Wayne C. Jaeschke; Real J. Grandmaison

[57] ABSTRACT

The invention relates to moldable, radically polymerizable multicomponent mixtures, which may even be present in the form of storable multicomponent systems, containing ethylenically unsaturated, polymerizable compounds, if desired in admixture with soluble and/or insoluble fillers and/or other auxiliaries, and an activator system initiatable by contact with oxygen, characterized in that, in their in-use form, the multicomponent mixtures are present as at leastly slightly thickened material and contain an activator system based on the following principal components which can be initiated by contact with ambient air:

N-alkyl-substituted tert.-arylamines containing at least one aliphatic CH bond in the α-position, metal compounds at least partly soluble in the system to accelerate the drying of unsaturated oils, and weakly acidic carboxylic acids having $pK_s$ values no lower than about 0.9.

In their in-use form, the multicomponent mixtures preferably have a minimum viscosity of at least about 50 to 100 mPa.s. The invention also relates to the use of the activator systems of these mutlicomponent mixtures for the time-controlled hardening—with a predeterminable pot-life—of olefinically unsaturated systems by contact with ambient air at room temperature or only moderately elevated temperatures.

18 Claims, No Drawings

NEW RADICALLY POLYMERIZABLE MULTICOMPONENT MIXTURES AND THEIR USE (III)

This application is a continuation of application Ser. No. 07/655,457 filed on Feb. 28, 1991 now abandoned.

BACKGROUND OF THE INVENTION

1. Field of the Invention

This invention relates to new moldable, radically polymerizable multicomponent mixtures which are used, for example, as free-flowing or spreadable compositions or as pastes and then hardened under ambient conditions through initiation of the polymerization reaction. In applicational terms, the invention relates in this regard to almost any field where radically polymerizable or curable compositions are used, including for example adhesives, sealing compounds, the specific production of plastics moldings, surface coating with air-hardening and, in particular, solventless paint systems and the like.

2. Discussion of Related Art

The peroxide- or hydroperoxide-initiated hardening of olefinically unsaturated systems requires activator systems made up of several components, particularly when the reaction is to be initiated at low temperatures, for example at room temperature or only slightly elevated temperature. It is known that selected tertiary amine compounds partly aromatically substituted at the nitrogen atom perform such an activating function. Known activators for the initiation of polymerization reactions by benzoyl peroxide, for example, are in particular dimethyl aniline and dimethyl-p-toluidine.

A totally different known class of activators for oxidative initiation of the polymerization of certain unsaturated systems, namely drying oils, are metal compounds—at least partly soluble in the system—of metals which can occur in several valency stages and accelerate the initiating reaction through intermediate shifts in valency on interaction with other components of the system. Metal compounds such as these—sufficiently soluble in organic solvents and/or in binders—of metals of the type in question have long been known as so-called driers for the air drying of paints, varnishes and the like based on unsaturated oils. Sufficiently oil-soluble compounds of transition metals, which are capable of occurring in several valency stages, are particularly suitable for this purpose. The individual components differ in their ability to accelerate hardening, compounds of cobalt and/or manganese being particularly suitable, although iron also accelerates hardening. In addition to and, in particular, in combination with these highly active metallic components, it is possible to use comparable compounds of other metals which may also be capable of forming several valency stages. A detailed description of such systems can be found, for example, in "Ullmann, Encyklopädie der technischen Chemie", 4th Edition, Vol. 23 (1983), 421-424.

It is also known that the two types of promoters described here for the radical initiation of polymerization can lead by interaction to an enhanced effect. For example, the Article by L. HORNER et al "Autoxidationsstudien an N,N-dialkylierten Anilinderivaten (Autoxidation Studies on N,N-Dialkylated Aniline Derivatives", in Makromolekulare Chemie 93 (1966), 69 to 108, relates to investigations into the acceleration of the spontaneous autoxidation of N-dialkyl-substituted arylamine compounds in pure, highly dry oxygen gas. In the first stage of the spontaneous autoxidation, the amine hydroperoxide compound is formed at aliphatic CH groups in the α-position under the effect of dried, superpure oxygen. This spontaneous autoxidation of the N,N-dialkylated arylamines takes place very slowly. According to the Article in question, the co-use of cobalt-(II) compounds and, to a lesser extent, the co-use of iron(III) salts results in activation of the autoxidation process. In further studies reported in this Article, it is shown that acetic acid also has a pronounced accelerating effect on autoxidation at the teriary amine compound whereas stronger acids, such as trichloroacetic acid, or mineral acids form true tertiary ammonium salts which are not autoxidizable. The use of cobalt ions in conjunction with acetic acid leads to the vigorously catalyzed autoxidation of dialkyl aniline compounds under the effect of superpure oxygen.

Finally, the Article cited above describes studies into the initiation of the polymerization of vinyl compounds by the dimethyl aniline/superpure oxygen/cobalt salt system. High-purity acrylonitrile, methyl methacrylate, ethyl acrylate and styrene can be polymerized with this system. The initiating reaction is interpreted as redox catalysis in which molecular oxygen acts as oxidizing agent. There are no references in the publication in question to the suitability of the multicomponent systems investigated for practical use in the polymerization field. In fact, however, these theoretical works, which have been available to experts for almost 25 years, have not provided any encouragement for their practical application.

The problem addressed by the invention is to utilize existing knowledge of multicomponent redox systems as described above in developing new possibilities for the practical application of activator systems which may be used in simplified manner for initiating the polymerization of olefinically unsaturated systems. The activator systems are intended to be able, in admixture with radically polymerizable materials or mixtures, to be activated by contact with ambient air. In preferred embodiments, this activation is intended to take place at temperatures as low as room temperature, although a moderate increase in temperature may be applied. In one particularly important embodiment, the invention relates to multicomponent mixtures of the type mentioned which are capable, simply by contact with ambient air at room temperature, of initiating the starting reaction of a radical polymerization of unsaturated systems with time-controlled hardening and a predeterminable pot life.

DESCRIPTION OF THE INVENTION

In a first embodiment, therefore, the present invention relates to the use of activator systems for the radical polymerization of olefinically unsaturated systems containing as principal components of the activator system N-alkyl-substituted tert.-arylamines containing at least one aliphatic CH bond in the α-position,
metal compounds at least partly soluble in the system to accelerate the drying of unsaturated oils, and
weakly acidic compounds, more especially monomeric and/or polymeric carboxylic acids, preferably having $pK_a$ values no lower than about 0.9 for the time-controlled hardening—with a predeterminable pot life—of moldable mixtures containing the radically polymerizable components, particularly together with dissolved and/or undissolved fillers and/or auxiliaries, by ambient air at room temperature and/or moderately elevated temperatures, preferably during the molding of the mixtures.

In a second embodiment, therefore, the present invention also relates to moldable, radically polymerizable multicomponent mixtures containing ethylenically unsaturated, polymerizable compounds, if desired in admixture with soluble and/or insoluble fillers and/or other auxiliaries, and an activator system initiatable by contact with oxygen, characterized in that, in their in-use form, these multicomponent mixtures are present as at leastly slightly thickened material and contain an activator system based on the following principal components which can be initiated by contact with oxygen and water and, in particular, by contact with ambient air:

N-alkyl-substituted tert.-arylamines containing at least one aliphatic CH bond in the α-position metal compounds at least partly soluble in the system to accelerate the drying of unsaturated oils and weakly acidic carboxylic acids having $pK_a$ values no lower than about 0.9.

Accordingly, the essence of the teaching according to the invention lies in the choice of the specific reactive system which is being described for the first time in this combination of the required conditions and/or possibilities of use. This system differs from the investigations described by L. HORNER et al in several respects:

The invention seeks to create the opportunity to work under practical in-use conditions. One particular requirement to be satisfied in this regard is that the catalyst systems active as so-called "autox" systems should be converted into the active state on contact not with pure and predried oxygen, but with ambient air with its comparatively limited oxygen content and the impurities always present, including moisture. For the purposes of practical application, the components to be polymerized are almost always present in admixture with fillers and/or other auxiliaries.

The invention is based on the observation that the problem stated above can be solved taking into account the elements described in detail in the following. Additional freedom in regard to practical application can be created by suitable auxiliary measures which are described in the following. Mere contact with air at ambient temperature or at most moderately elevated temperatures is sufficient to activate the starter system and, hence, to initiate the reaction in the system as a whole for dimensionally stable hardening. The open time of the system required for molding may be varied within wide limits. Practical significance is thus attributed to multicomponent systems having the composition according to the invention in the broadest applicational sense.

The three components of the activator system used in accordance with the invention will first be described in detail in the following:

N-alkyl-substituted tert.-arylamines

All corresponding compounds containing at least one aliphatic CH bond in the α-position are suitable. The amine components used in accordance with the invention correspond in particular to general formula I:

in which $R_1$ is an optionally substituted aryl radical, $R_2$ has the same meaning as $R_1$ or may even be an optionally substituted alkyl radical. This alkyl radical may be linear or branched. $R_3$ is a linear or branched alkyl radical which may even be substituted and which may be the same as or different from the alkyl radical optionally present in $R_2$, but is always distinguished by the fact that at least one H atom is present in the α-position to the N.

The preferred aryl radical is the phenyl radical which may even be substituted, more especially alkyl-substituted. The alkyl radicals present in $R_3$ and optionally $R_2$ each preferably contain up to about 10 carbon atoms and, in particular, up to about 6 carbon atoms. Particular significance is attributed to corresponding $C_{1-3}$ radicals and again to the methyl radical in particular. In one preferred embodiment, the radicals $R_2$ and $R_3$ are corresponding, optionally substituted alkyl radicals while the radical $R_1$ is an optionally substituted phenyl radical, so that N,N-dialkyl-substituted aniline compounds, which may also be alkylated in the phenyl ring, are generally preferred. The most important components in the context of the invention are dimethyl aniline and, in particular, dimethyl-p-toluidine.

Basically, the principles stated by L. HORNER et al, loc. cit., apply to the activity and the activatability of these tertiary amine compounds: nucleus substituents influence the autoxidation rate of the dimethyl aniline. Electron donors increase the autoxidizability of the amine, electrophilic substituents reduce it. Accordingly, p-toluidine compounds are more reactive than the otherwise structurally identical aniline derivatives. The general principles stated by HORNER also apply with regard to the alkyl substitutents in $R_3$ and $R_2$. The methyl group is much more accessible to oxidation than all other N-alkyl substituents. Basically, the known results of the action of dibenzoyl peroxide on tertiary amines, as reported in the cited literature reference, also apply here.

Metal Compounds at Least Partly Soluble in the System

As already mentioned, the most important driers of the type in question are distinguished by the fact that, above all, metal compounds of metal capable of occurring in several valency stages are used. Selected representatives of the transition metals can be particularly active in this regard. The particular choice of the metal may have inter alia a velocity-determining effect on the initiation of polymerization on account of a certain dependence on temperature of the reactive intervention of this metal component in the process as a whole. Components which are highly active at room temperature are derived in particular from cobalt and/or manganese. Iron also has a certain, albeit weaker, effect in accelerating the reaction at room temperature. The activity of other metal components, for example those based on vanadium, can be increased by increasing the temperature to such an extent that the polymerization reaction can be rapidly initiated.

Cobalt and/or manganese compounds, optionally in admixture with other metallic components, such as compounds of lead, cerium, calcium, barium, zinc and/or zirconium, are particularly suitable for working at room temperature which is of particular advantage for numerous applications. Reference is made in this regard to the relevant specialist literature, cf. for example the cited publication in "Ullmann" loc. cit. and the literature cited therein.

The metals in question here are used in the form of such compounds that they are at least partly soluble in the system as a whole. Both soap-like metal compounds and also types attached otherwise, particularly in complex form, to organic radicals are suitable. A typical example of working in accordance with the teaching of the invention is the use of corresponding metal naphthenates or metal acetyl acetonates. Providing inorganic salts are sufficiently soluble in the system, it is also possible to use such inorganic systems. A typical example is iron chloride which has a distinctly accelerating effect when used in the system according to the invention.

It may be advisable to use the metal compounds in a low valency stage of the metal, i.e. for example as cobalt(II) or manganese(II). In other cases, it is also suitable to use the metal compound in the higher valency stage of the metal. Thus, iron chloride, for example, is preferably used in the form of the $Fe^{3+}$ salt.

Carboxylic Acid Compound(s)

A factor of crucial importance in the selection of these components is the acidity of the free carboxylic acid. The $pK_a$ value of the free acid should be no lower than about 0.9, the preferred limit being at about 1.

If much more strongly acidic components are used, acceleration of the reaction comes to a stop. This is illustrated by the following examples. The $pK_a$ value of trichloroacetic acid is approximately 0.6. The addition of trichloroacetic acid to the system destroys the ability of the multicomponent initiator system used in accordance with the invention to initiate polymerization reactions. By contrast, dichloroacetic acid is a relatively weak carboxylic acid with a $pK_a$ value of approximately 1.3. This dichloroacetic acid is eminently suitable for initiating polymerization reactions in accordance with the invention. Strongly acidic mineral acids, for example hydrochloric acid, also affect the ability of the activator systems used in accordance with the invention to initiate polymerization reactions. Acetic acid ($pK_a$ value of acetic acid approx. 4.76) is eminently suitable for accelerated reaction initiation.

The upper limit to the $pK_a$ value may be seen in the region of very weakly acidic compounds—determined as free carboxylic acid. In numerical terms, therefore, the upper limit is at $pK_a$ values of approximately 13 and, preferably, at $pK_a$ values of approximately 11.5. However, carboxylic acids which have $pK_a$ values in the hydrolyzed state of up to about 8 and preferably of up to about 6 or 7 are particularly suitable. Particularly effective components of the type in question here are thus derived from carboxylic acids which have $pK_a$ values in the hydrolyzed state in the range from about 1 to 6 or 7.

The carboxylic acids to be used in accordance with the invention may contain one or more carboxyl groups. The constitution of the acid as such is not such a crucial parameter given the correct $pK_a$ value. The systems according to the invention may advantageously be based on carboxylic acids containing 1 to 4 carboxyl groups and, more particularly, 1 or 2 carboxyl groups.

The choice of the particular carboxylic acid is also largely determined by corresponding expediency considerations. Readily obtainable carboxylic acids, such as lower aliphatic carboxylic acids or corresponding aromatic mono- or polybasic carboxylic acids are suitable components. Suitable aliphatic carboxylic acids are $C_{1-18}$ and preferably $C_{1-10}$ monocarboxylic acids, acetic acid again being particularly important. Suitable aromatic carboxylic acids are benzoic acid or corresponding polycarboxylic acids, for example trimellitic or pyromellitic acid. As shown with reference to the example of dichloroacetic acid, substituted acids of this type are also suitable providing their $pK_a$ value is within the stated limits.

In one embodiment of the invention, the free carboxylic acids or carboxyl groups of the activator system are at least partly formed by COOH groups attached to preformed oligomeric and/or polymeric compounds. These carboxyl groups may thus be utilized in several respects in the context of the teaching according to the invention. In the polymerization initiation phase, these acid components perform the described activating function. Quite apart from this, however, there are the general chemical principles under which free carboxyl groups of the type in question can impart characteristic properties to the reaction product hardened in particular in dimensionally stable form. A possible coupling effect with respect to solid surfaces, for example of metal, or the increased possibility of attacking alkaline media are mentioned purely by way of example in this regard.

The free carboxyl groups in the oligomeric and/or polymeric components may be reactively bound into the dimensionally stable reaction product formed and/or may be present as non-reactive fillers in the hardened reaction product, depending on the particular structure of the oligomeric or polymeric additives.

However, the invention also encompasses this multifunctionality of acidic components used in a totally different way:

Radically initiated polymerization reactions may generally be carried out using ethylenically unsaturated free acids. Such compounds as acrylic acid, methacrylic, crotonic acid, itaconic acid, maleic acid and/or fumaric acid and also olefinically unsaturated compounds of the tetrahydrophthalic acid type and related compounds are particularly well-known as reactive mono- and/or dicarboxylic acids in this regard. Finally, however, it is also known that relatively long-chain, mono- or polyolefinically unsaturated carboxylic acids, particularly unsaturated fatty acids of the type mentioned containing, for example, 10 to 30 carbon atoms and, in particular, 12 to 24 carbon atoms, can be included in radically initiated polymerization reactions through their content of ethylenic double bonds.

In the embodiment of the invention under discussion, acid components of the type in question are not only activated as constituents of the reaction mixture hardening by polymerization, they are also able through their free acid groups at least partly to perform the acid function in the activator system used in accordance with the invention of tertiary amine compound, at least partly soluble metal compound and acidic component of limited acitivity. It is clear that this provides for wide variation of the active-substance mixtures to be used.

Activator systems of the three principal components described in the foregoing, namely aromatic amine compound, at least partly soluble metallic drier and weak acid are able after taking up moisture and oxygen from the ambient air to initiate all the radically polymerizable, olefinically unsaturated systems which, hitherto, have been used with a variety of different, particularly peroxidic, starter systems. To this extent, the other constituents of the radically polymerizable, moldable multicomponent mixtures according to the invention may be as defined in the extensive relevant literature which is concerned with the production and processing of systems based on olefinically unsaturated radically polymerizable compounds. A very large number of systems of this type tailored in their properties to the particular application envisaged are currently available to the expert.

Systems distinguished by at least slightly elevated viscosity values at the onset of the polymerization reaction are particularly suitable for the initiation of polymerization by atmospheric oxygen activated in accordance with the invention, particularly at room temperature or only moderately elevated temperature. Tests have actually shown that the use of ambient air, even where a basically highly active combination of activating agents is used, does not lead to reaction initiation in the right time, if at all, when highly mobile unsaturated systems are used, even where they are known per se for their high reactivity in the polymerization reaction. Typical examples of such systems are conventionally stabilized lower acrylate esters, methacrylate esters or styrene. An activator system of, for example, dimethyl-p-toluidine, soluble cobalt compounds and acetic acid hardens commercially available, unsaturated components of the type just mentioned on contact with ambient air at room temperature only when the viscosity of the system as a whole is slightly increased.

Generally, therefore, radically polymerizable systems with an initial viscosity of at least about 30 to 100 mPa.s and preferably of at least about 200 or 300 mPa.s should be used in accordance with the invention. Particularly safe initiation of the polymerization reaction can be expected in the case of systems which have an initial viscosity of at least about 500 mPa.s and, more especially, of at least about 1000 mPa.s. All these viscosity values are determined by Brookfield viscosimeter at about 20° C. Commercially available adhesive systems are known to have viscosities of at least about 3,000 mPa.s and, more particularly, viscosity values of up to about 10,000 mPa.s. Materials of this type understandably are eminently suitable for processing in accordance with the invention. However, the invention is by no means limited to such materials. Considerably less viscous systems, for example spreadable paint systems used in particular as solventless systems, are suitable for the reaction-initiating mechanism described herein providing the above-mentioned minimum values for the initial viscosity of the material to be molded are observed. The same applies to other fields of application, for example the production of plastics moldings based on styrene-/unsaturated polyester resins.

The necessary viscosity values may be established in particular by mixtures which have an adequate content of oligomeric and/or polymeric components, optionally in admixture with low molecular weight, unsaturated components liquid at room temperature, such as (meth-)acrylates. However, correspondingly viscous materials may also consist solely of precondensates of suitable fluidity. The extensive knowledge of experts on ethylenically unsaturated mixtures such as these hardenable by radical polymerization may be applied in this regard.

The multicomponent mixtures to be used in accordance with the invention may be formulated as multicomponent systems. For the practical application of the system, the components are mixed with one another in known manner. The open pot life of the system may be regulated by suitable choice and adaptation of the principal components of the activator system, so that the starting reaction may be initiated and, hence, the system ultimately hardened under ambient conditions in air. In one preferred embodiment of the invention, the multicomponent mixtures in question of activator system and polymerizable components are formulated as multicomponent systems which are non-reactive, even on contact with air, two-component systems in particular being present as multicomponent systems. In addition, it is particularly preferred in this regard to separate the three main components of the activator systems used in accordance with the invention from one another in such a way that the tert. N compound is kept separate from the metal compounds and the free carboxylic acids. Both components may thus generally contain ethylenically unsaturated reaction product. For processing, these two separately stored components merely have to be mixed, molded during the open pot life of the system and brought into contact with ambient air.

The invention provides for the formulation of optimized active-substance mixtures. Without departing from the principles of the invention, it is possible to use soluble and/or insoluble fillers, elasticizers, thickeners, thixotropic agents, pigments, coupling agents, stabilizers and the like without endangering the performance of the activator system according to the invention. This does of course presuppose that disturbances in the interaction of the activator components are precluded through the choice of the auxiliaries and fillers. General chemical knowledge may be applied this this regard.

One particular feature of the multicomponent mixtures according to the invention or rather the activator systems used therein is that additional inhibition and hence control of the system as a whole is possible.

Various mechanisms are available for inhibiting the "autox" system used in accordance with the invention, of which the three basic types 1 to 3 are listed below:

1. stabilization against $O_2$, addition of antioxidants,
2. stabilization against R—OOH, addition of reducing agent,
3. stabilization against radicals, addition of radical inhibitors.

From general knowledge of chemistry, typical stabilizer components are listed in the following, the numbers in brackets after the particular compound indicating which of the three mechanisms listed above is to be assigned to the stabilizer: pyrogallol (1), $O_2$-inhibited acrylates (1), hydroquinone (1,3), hydroquinone monomethyl ether (1,3), triphenyl phosphine (2), tributyl phosphite (2), butyl hydroxytoluene (3), phenothiazine (3).

In the multicomponent mixtures according to the invention, the activator mixtures preferably make up no more than about 25% by weight and, in particular, no more than about 10% by weight, based on the weight of the system as a whole. Depending on the activity of the components used, the weight of the activator mixture can be greatly reduced, for example to about 0.1% by weight or to at least about 0.5% by weight. Particularly suitable quantities of the activator system are at least about 1% by weight, preferably up to about 8% by weight and more preferably from about 1 to 7% by weight. All these figures are based on the one hand on the total weight of the multicomponent system according to the invention and the total weight of the three principal components of the activator system.

The three principal components of the activator system may advantageously be used in the following quantitative ratios to one another (in % by weight, based on the mixture of the three activator constituents):

- 5 to 20% and preferably 5 to 15% of the metal compound,
- 30 to 60% and preferably 40 to 55% of the teriary amine compound,
- 30 to 60% and preferably 40 to 55% of the masked weak acid.

The particular quantities in which the metal compounds are used may also be defined in particular through the ratio by weight of the weight of the metal to the weight of the multicomponent activator system as follows:

Preferred quantities of metal compound are from 0.01 to 5% by weight, preferably from 0.05 to 2% by weight and more preferably from about 0.1 to 1% by weight metal, based on the total weight of the activator constituents.

If inhibitors and/or stabilizers of the type mentioned above are used to control the course of the reaction and/or the open pot life, the quantities in which they are used will be gauged according to the stated purpose. In each individual case, they may readily be determined by considerations appropriate to the expert and/or by preliminary tests. The regulators used will normally not exceed a few percent, for example about 2 to 5% by weight, of the mixture as a whole and are generally used in quantities of less than 1% by weight.

Mixtures of oligomers and/or polymers together with ethylenically unsaturated monomers of low molecular weight are used as mixtures of radically polmerizable materials suitable and typically used for a variety of applications in practice. The mixture components of relatively high molecular weight are often at least partly dissolved in the monomers. Mixtures of this type are particularly suitable for processing in accordance with the invention. The content of monomers, for example (meth)acrylates, optionally substituted styrene and/or acrylonitrile, is generally at least 10% by weight, preferably at least 20% by weight and, in many applications, at least about 40% by weight, based on the final reactive mixture as a whole. In terms of weight, the monomer component may be by far the predominant component so that, for example, 60 to 80% by weight of the mixture as a whole is formed by the low molecular weight monomers. As mentioned above, however, it is important to ensure that the at least slightly increased initial viscosity of the mixtures for safe reaction initiation on contact with air is guaranteed by the use of an adequate quantity of compounds of relatively high molecular weight and/or by other thickening agents.

In characteristic examples of application, which fall within the scope of the invention as preferred embodiments, these conditions of use are guaranteed in any case. Without any claim to completeness, the following examples are mentioned here: aerobic adhesive systems, spreadable compositions for surface coating with polymerizable, in particular solvent-free lacquers and paints in the form of spreadable air-drying paint systems and the production of moldings with initiation of the reaction involved by contact with ambient air, for example based on styrene/unsaturated polyester resins.

EXAMPLES

Examples 1 to 9

| Solution A | |
|---|---|
| MMA (methyl methacrylate) | 60 |
| Polyacrylate (Plexigum MB 319, Röhm soluble filler) | 30 |
| Cobalt acetyl acetonate | 0.24 |
| Acrylic acid | 10 |
| Solution B | |
| MMA | 60 |
| Plexigum MB 319 | 30 |
| N,N-dimethyl-p-toluidine | 10 |

The above quantities are parts by weight.

Solutions A and B were mixed in various quantitative ratios and the adhesive preparations obtained were used to bond PVC.

| Example No. | Quantitative ratio A:B | Pot life (mins.) | Tensile shear strength (N/mm$^2$) |
|---|---|---|---|
| 1 | 9:1 | 11 | 1.0 |
| 2 | 8:2 | 11 | 1.4 |
| 3 | 7:5 | 12 | 1.4 |
| 4 | 6:4 | 12 | MF (1.7) |
| 5 | 5:5 | 13 | MF (1.9) |
| 6 | 4:6 | 13 | MF (3.2) |
| 7 | 3:7 | 16 | MF (2.5) |
| 8 | 2:8 | 20 | MF (2.5) |
| 9 | 1:9 | 36 | MF (3.6) |

MF = material failure

To guarantee adequate oxygen uptake, the particular mixture was vigorously stirred in air for 1 minute and the substrates coated with the adhesive preparation were left in air for 2 minutes before being fitted together.

Examples 10 to 19

Variation of the amine concentration
Mixtures of
- 6 g MMA
- 4 g Plexigum MB 319
- 0.5 g acetic acid and
- 50 mg of a solution of cobalt naphthenate in gasoline (6% Co) and different quantities of N,N-dimethyl-p-toluidine harden on contact with atmospheric oxygen.

| Example No. | Quantity of amine (%) | Pot life (mins.) | Tensile shear strength (N/mm$^2$) |
|---|---|---|---|
| 10 | 1 | 13 | 3.1 (MF) |
| 11 | 2 | 12 | 8.1 (MF) |
| 12 | 3 | 12 | 7.6 (MB) |
| 13 | 4 | 11 | 4.7 (MB) |
| 14 | 5 | 11 | 7.1 (MB) |
| 15 | 6 | 10 | 8.5 (MB) |
| 16 | 7 | 14 | 6.4 (MF) |
| 17 | 8 | 14 | 7.6 (MB) |
| 18 | 9 | 15 | 7.6 (MB) |
| 19 | 10 | 13 | 5.8 (MB) |

Examples 20 to 29

Variation of the Carboxylic Acids and the Monomers

Mixtures of 89.5% monomer (mixture) and 10.5% initiator system consisting of
5% N,N-dimethyl-p-toluidine 0.5% cobalt naphthenate solution in gasoline (6% Co)
5% carboxylic acid
harden on contact with atmospheric oxygen.

| Example No. | Monomer | Carboxylic acid | Pot life (mins.) |
|---|---|---|---|
| 20 | K 8[1)]/MMA | Acetic acid | 10 |
| 21 | " | Propionic acid | 11 |
| 22 | " | Chloroacetic acid | 10 |
| 23 | " | Carboset 515[2)] | 90 |
| 24 | MMA/PMMA[3)] | Acetic acid | 10 |
| 25 | " | Acrylic acid | 9 |
| 26 | " | Dichloroacetic acid | 12 |
| 27 | Methacrylate-terminated PUR[4)] | Acetic acid | 2 |
| 28 | THF-MA/PMMA[5)] | Acetic acid | 11 |
| 29 | MMA/PMMA | Benzoic acid | 25 |

[1)] 1:1 Mixture of MMA and a methacrylate-terminated polyester PUR (reaction product of CAPA 200, a polycaprolactone manufactured by Union Carbide - OH value 209, 2 mol), 2,4-tolylene diisocyanate (Desmodur T 100, a product of Bayer AG, 3 mol) b-01/20 (a polypropylene glycol monobutyl ether manufactured by Hoechst, 1 mol), hydroxyethyl methacrylate (HEMA, 1 mol)
[2)] An acrylic acid copolymer manufactured by B.F. Goodrich, acid value 60 to 65
[3)] A mixture of 60 parts MMA and 40 parts Plexigum MB 319 (a polyacrylate manufactured by Rhm)
[4)] A methacrylate-terminated PUR (reaction product of 1 mol B 01-20, TDI and HPMA)
[5)] A mixture of 2 parts tetrahydrofurfuryl methacrylate and 1 part Plexigum MB 319

Example 30

A mixture of
53% MMA
25% Plexigum MB 319
4% N,N-dimethyl-p-toluidine
4% acetic acid
3% Mn(II) octoate
polymerizes 15 minutes after contact with atmospheric oxygen.

Examples 31 to 34

Variation of the Amines

Mixtures consisting of
50 parts MMA
40 parts Plexigum MB 319
3 parts acetic acid
3 parts amine
0.5 part cobalt naphthenate

| Example | Amine | Pot life (mins.) |
|---|---|---|
| 31 | N,N-dimethyl aniline | 60 |
| 32 | N-ethyl-N-methyl aniline | 47 (5 parts amine, 5 parts acid) |
| 33 | N,N-dimethyl-m-toluidine | 26 |
| 34 | N,N-dimethyl-p-toluidine | 18 |

Example 35

The following activator system: 5% acetic acid, 5% dimethyl-p-toluidine, 0.5% cobalt solution) was added to the dimethacrylate of bisphenol A×2 EO (Diacryl 101) with no addition of thickener.
The pot life is 1 minute.

Example 36

The initiator mixture of Example 35 is added to the reaction product of bisphenol-A-diglycidyl ether with methacrylic acid (Rütapox 959, a product of Rütgers) with no addition of thickener.
The pot life is under 1 minute.

Example 37

The initiator system of Example 35 is added to Vestopal 150, a commercial product manufactured by Hüls (unsaturated polyester resin, 66% in styrene), with no addition of thickener.
The pot life is 1.5 minutes.

Example 38

The following initiator system: 3% acetic acid, 3% dimethyl-p-toluidine, 0.5% cobalt solution, is added to a mixture of cyclohexyl methacrylate and Plexigum MB 319.
The pot life is 16 minutes.

We claim:

1. The process of initiating the radical polymerization of olefinically unsaturated polymerizable components comprising mixing said components with an activator system consisting essentially of
   (a) from 30 to 60% by weight of a N-alkyl-substituted tertiary arylamine corresponding to formula I

in which $R_1$ is an unsubstituted or substituted aryl radical, $R_2$ is an unsubstituted or substituted aryl radical or an unsubstituted or substituted, linear, or branched alkyl radical, and $R_3$ is a substituted or unsubstituted linear or branched alkyl radical which has at least one H atom in the α-position to the N;
   (b) from 5 to 20% by weight of a metal compound which is soluble in said polymerizable components; and
   (c) from 30 to 60% by weight of a weakly acidic compound having a $pK_a$ value of at least about 0.9, all weights being based on the weight of said activator system, wherein the resultant mixture has an initial viscosity of at least between about 30 and about 100 mPa.s as measured at about 20° C. with a Brookfield viscosimeter, and exposing the resulting mixture to ambient air at room temperature or elevated temperature.

2. The process as in claim 1 wherein said olefinically unsaturated polymerizable components have an initial viscosity of at least about 30 mPa.s.

3. The process as in claim 1 including adding a filler to said olefinically unsaturated polymerizable components prior to mixing said components with said activator system.

4. The process as in claim 1 wherein $R_1$ is a phenyl radical and said component (a) is a N, N-dialkyl-substituted aniline compound.

5. The process as in claim 4 wherein said component (a) is selected from the group consisting of dimethyl aniline and dimethyl-p-toluidine.

6. The process as in claim 1 wherein said component (b) is present in more than one valency state.

7. The process as in claim 1 wherein said metal compound contains a transition metal selected from the group consisting of cobalt, manganese, iron and vanadium.

8. The process as in claim 1 wherein said component (c) has a pK$_a$ value of up to about 13.

9. The process as in claim 1 wherein said component (c) comprises a carboxylic acid containing 1 to 4 carboxyl groups.

10. The process as in claim 1 wherein said olefinically unsaturated polymerizable components are selected from the group consisting of acrylates, methacrylates, styrene, substituted styrene and acrylonitrile-containing compounds.

11. The process as in claim 1 including adding to said olefinically unsaturated polymerizable components a material selected from the group consisting of thickener, plasticizer, pigment, coupling agent, stabilizer, anti-oxidant, reducing agent and radical inhibitor.

12. The process as in claim 1 wherein said activator system is present in an amount of up to about 25%/wt, based on the weight of said resultant mixture.

13. The process as in claim 1 wherein said olefinically unsaturated polymerizable components contain at least about 20% by weight of monomers, based on the weight of said polymerizable components.

14. A moldable, radically-polymerizable, multi-component mixture comprising olefinically unsaturated polymerizable components and an activator system consisting essentially of (a) from 30 to 60% by weight of a N-alkyl-substituted tertiary arylamine corresponding to formula I

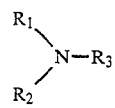

in which R$_1$ is an unsubstituted or substituted aryl radical, R$_2$ is an unsubstituted or substituted aryl radical or an unsubstituted or substituted, linear, or branched alkyl radical, and R$_3$ is a substituted or unsubstituted linear or branched alkyl radical which has at least one H atom in the α-position to the N;

(b) from 5 to 20% by weight of a metal compound which is soluble in said polymerizable components; and (c) from 30 to 60% by weight of a weakly acidic compound having a pK$_a$ value of at least about 0.9, all weight being based on the weight of said activator system, wherein said activator system is initiated by contact with ambient air.

15. A mixture as in claim 14 having an initial viscosity of at least between about 30 and about 100 mPa.s as measured at about 20° C. with a Brookfield viscosimeter.

16. A mixture as in claim 14 wherein said component (c) comprises an ethylenically unsaturated mono- or di-carboxylic acid selected from the group consisting of acrylic acid, methacrylic acid, crotonic acid, itaconic acid, maleic acid, and fumaric acid.

17. A mixture as in claim 14 wherein said component (c) comprises at least one COOH group attached to preformed oligomer or polymer compounds.

18. A mixture as in claim 14 wherein said component (a) is kept separate from said components (b) and (c) before mixing with said mixture of olefinically unsaturated polymerizable components.

* * * * *